(12) United States Patent
Curtis

(10) Patent No.: US 6,494,482 B2
(45) Date of Patent: Dec. 17, 2002

(54) WEIGHT SENSOR ASSEMBLY FOR DETERMINING SEAT OCCUPANT WEIGHT

(75) Inventor: Brian M. Curtis, Lake Orion, MI (US)

(73) Assignee: Siemens VDO Automotive Corporation, Auburn HIlls, MI (US)

(*) Notice: Subject to any disclaimer, the term of this patent is extended or adjusted under 35 U.S.C. 154(b) by 0 days.

(21) Appl. No.: 09/971,412

(22) Filed: Oct. 5, 2001

(65) Prior Publication Data

US 2002/0020994 A1 Feb. 21, 2002

Related U.S. Application Data

(63) Continuation of application No. 09/598,087, filed on Jun. 21, 2000.
(60) Provisional application No. 60/141,105, filed on Jun. 25, 1999.

(51) Int. Cl.$^7$ .............. B60R 21/32; G01L 1/22; G01G 3/14
(52) U.S. Cl. ............ 280/735; 180/273; 73/853; 73/862.629; 177/211
(58) Field of Search ............ 280/735; 180/273; 297/217.2; 73/812, 849, 853, 856, 855, 862.474, 862.627, 862.634, 862.629; 177/136, 211, 144

(56) References Cited

U.S. PATENT DOCUMENTS 2,708,005 A    5/1955   Gazzo (List continued on next page.)

FOREIGN PATENT DOCUMENTS

| DE | 38 09 074 C2 | 3/1992 |
| DE | 197 52 356 A1 | 5/1999 |
| DE | 199 31 379 A1 | 1/2001 |
| EP | 0 534 226 B1 * | 12/1996 |
| EP | 0 962 362 A2 | 12/1999 |
| EP | 0 990 565 A1 | 4/2000 |
| JP | 9 150662 | 6/1997 |
| WO | 0100454 | 1/2001 |

OTHER PUBLICATIONS

Research Disclosure, Jul. 1997, No. 399, p. 442.
International Search Report, Aug. 2000. PCT/US 00/17237.

*Primary Examiner*—Paul N. Dickson
*Assistant Examiner*—David R. Dunn

(57) ABSTRACT

A system for measuring the weight of a seat occupant is used to control airbag deployment. The system includes a plurality of weight sensors that have a first end mounted to a seat riser and a second end mounted to a seat frame or track member. The weight sensors have a central bendable portion that extends between the first and second ends. A groove is formed in one of the external surfaces of the central bendable portion to localize strain. A full bridge strain gage assembly is mounted on a surface of each of the weight sensors, opposite from the groove, for generating a weight signal in response to measuring deflection of the central bendable portion. A central processor determines seat occupant weight based on the weight signals and an airbag control module communicates with the processor. The control module controls deployment force of the airbag based on seat occupant weight.

8 Claims, 4 Drawing Sheets

U.S. PATENT DOCUMENTS

| | | |
|---|---|---|
| 3,022,976 A | 2/1962 | Zia |
| 3,766,344 A | 10/1973 | Nevett |
| 4,075,443 A | 2/1978 | Fatur |
| 4,181,012 A * | 1/1980 | Kiuchi ................. 73/862.634 |
| 4,558,757 A * | 12/1985 | Mori et al. .............. 178/18.05 |
| 5,232,243 A | 8/1993 | Blackburn et al. |
| 5,413,378 A | 5/1995 | Steffens, Jr. et al. |
| 5,474,327 A | 12/1995 | Schousek |
| 5,481,078 A | 1/1996 | Asche |
| 5,502,284 A | 3/1996 | Meiller et al. |
| 5,542,493 A | 8/1996 | Jacobson et al. |
| 5,570,903 A | 11/1996 | Meister et al. |
| 5,573,269 A | 11/1996 | Gentry et al. |
| 5,605,348 A | 2/1997 | Blackburn et al. |
| 5,612,876 A | 3/1997 | Zeidler et al. |
| 5,618,056 A | 4/1997 | Schoos et al. |
| 5,626,359 A | 5/1997 | Steffens, Jr. et al. |
| 5,670,853 A | 9/1997 | Bauer |
| 5,678,854 A | 10/1997 | Meister et al. |
| 5,732,375 A | 3/1998 | Cashler |
| 5,739,757 A | 4/1998 | Gioutsos |
| 5,804,887 A | 9/1998 | Holzapfel et al. |
| 5,810,392 A | 9/1998 | Gagnon |
| 5,942,695 A * | 8/1999 | Verma et al. ................. 73/768 |
| 5,971,432 A | 10/1999 | Gagnon et al. |
| 6,005,199 A * | 12/1999 | Harada et al. .............. 177/211 |
| 6,039,344 A | 3/2000 | Mehney et al. |
| 6,069,325 A | 5/2000 | Aoki |
| 6,070,115 A | 5/2000 | Oestreicher et al. |
| 6,092,838 A * | 7/2000 | Walker ....................... 280/735 |
| 6,161,891 A * | 12/2000 | Blakesley ................ 296/65.01 |
| 6,250,671 B1 * | 6/2001 | Osmer et al. ............... 280/735 |

\* cited by examiner

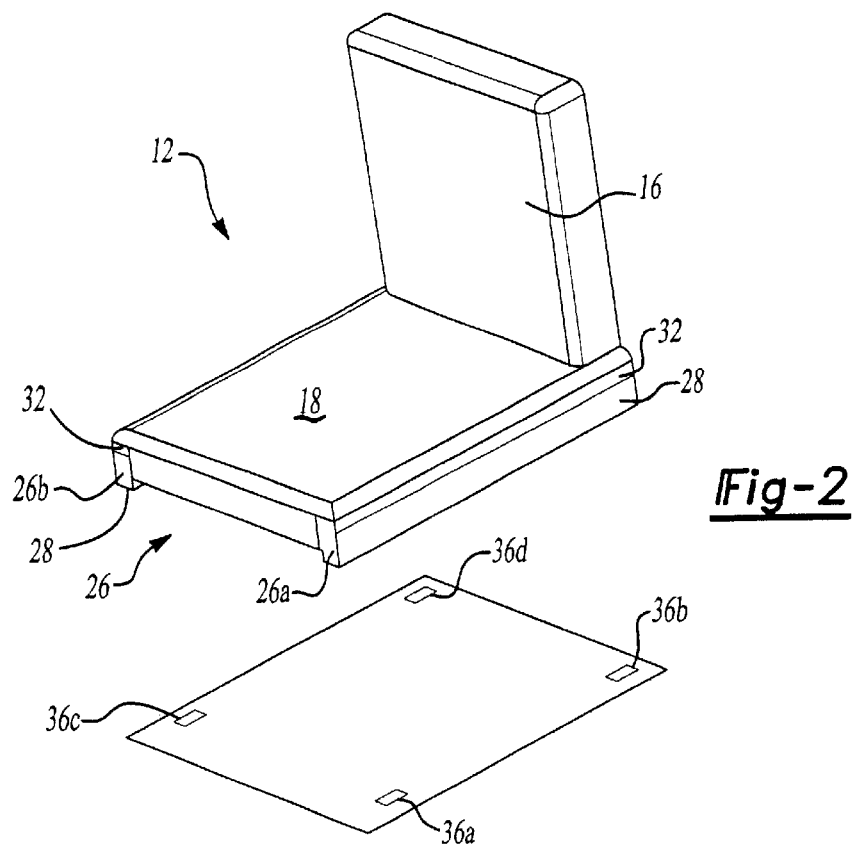
_Fig-2_
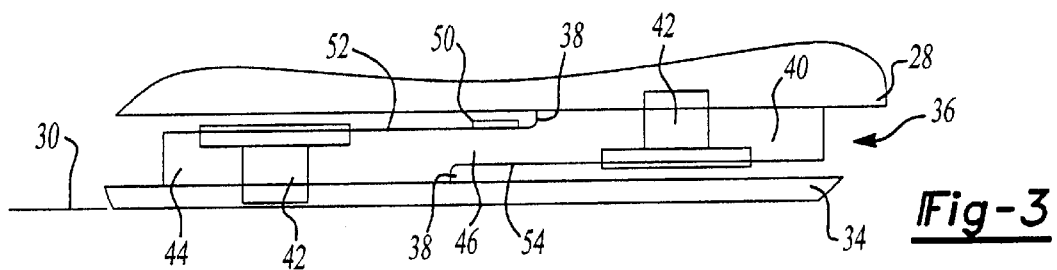
_Fig-3_
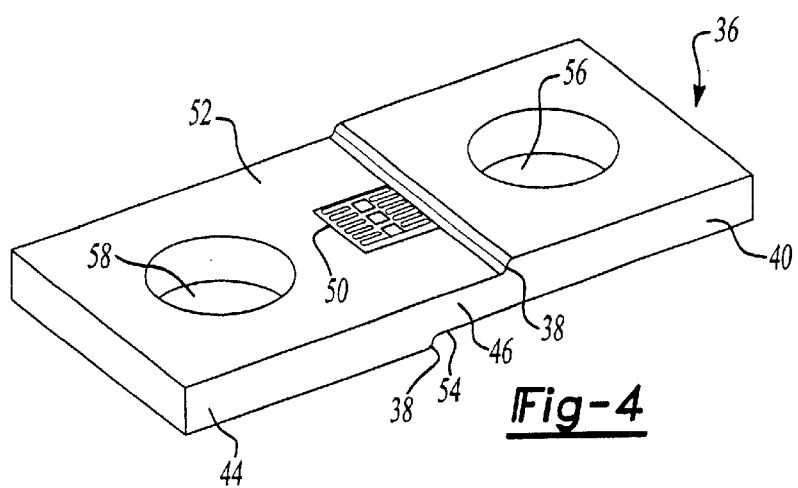
_Fig-4_

WEIGHT SENSOR ASSEMBLY FOR DETERMINING SEAT OCCUPANT WEIGHT

RELATED APPLICATION

This application is a continuation of Ser. No. 09/598,087 filed on Jun. 21, 2000, which claims priority to U.S. provisional application No. 60/141,105 filed on Jun. 25, 1999.

BACKGROUND OF THE INVENTION

1. Field of the Invention

This invention relates to an apparatus for measuring the weight of a seat occupant. Specifically, a sensor arrangement is mounted to a seat frame member to provide seat occupant weight measurements.

2. Related Art

Most vehicles include airbags and seatbelt restraint systems that work together to protect the driver and passengers from experiencing serious injuries due to a high speed collision. It is important to control the deployment force of the airbags and the force of the seatbelt pre-tensioners based on the size of the driver or the passenger. One way to control these forces is to monitor the weight of the seat occupant. If a smaller person such as a child or infant in a car seat is in the front passenger seat, the weight on the seat will be less than if an adult occupies the seat.

Current systems for measuring the weight of a seat occupant are complex and expensive. One type of system uses pressure sensitive foil mats mounted within the seat bottom foam. Another system uses sensors placed at a plurality of locations within the seat bottom cushion. The combined output from the mats or the sensors is used to determine the weight of the seat occupant. These sensors experience a substantially vertical force, due to the weight of the seat occupant, but are also subject to longitudinal and lateral forces caused by acceleration, deceleration, or turning. The lateral and longitudinal forces picked up by the sensor incorporate an error component into the weight measurement. The sensors are very sophisticated using multiple strain gages and complicated bending elements to provide high measurement sensitivity in the vertical direction and low sensitivity to lateral and longitudinal forces in order to increase accuracy.

Mounting these sensors within the seat bottom can also be difficult and time consuming. It is difficult to find mounting locations for each the sensors that will accommodate all of the various positions of a seated occupant while still providing accurate measurements. Further, shifting of the occupant on the seat can dislodge or move the sensors out of their proper location. Because the sensors are mounted within the seat bottom, it is difficult to reposition the sensors after the seat is installed in the vehicle.

Thus, it is desirable to have a simplified seat occupant weight measurement system that is accurate and easily to install and overcomes the above references deficiencies with prior art systems.

SUMMARY OF THE INVENTION

In a disclosed embodiment of this invention, a system for measuring the weight of an occupant seated on a vehicle seat includes a seat element mounted to a vehicle structure and a seat support member for supporting a seat bottom. A plurality of weight sensor assemblies are mounted between the seat element and the seat support member. Each of the weight sensor assemblies has a bottom surface and a top surface with a full bridge strain gage mounted on one of the surfaces.

In a preferred embodiment, each weight sensor assembly has a first end mounted to the seat element, such as a seat riser, and a second end mounted to the seat support member, such as a seat frame or track member, with a central bendable portion extending between the first and second ends. The strain gages each generate a weight signal in response to measuring deflection of the central bendable portion for the respective sensor assembly. A central processor determines the seat occupant weight based on the weight signals. An airbag control module communicates with the processor to control deployment force of an airbag based on seat occupant weight.

In a further preferred embodiment, each of the sensors includes at least one groove formed in one of the top or bottom surfaces. The groove extends at least partially along the width of the sensor to localize strain in the central bendable portion. The strain gage is placed on the other of the top or bottom surfaces, facing opposite from the groove.

The subject invention provides a simplified seat occupant weight measurement system that is inexpensive, accurate, and easily to install. These and other features of the present invention can be best understood from the following specification and drawings, the following of which is a brief description.

BRIEF DESCRIPTION OF THE DRAWINGS

FIG. 2 is an exploded view of a seat assembly incorporating the subject weight measurement system.

FIG. 3 is a side view, partially cut-away, of the seat of FIG. 2 showing the mounting of one sensor assembly.

FIG. 4 is a perspective view of the sensor assembly of FIG. 3.

DETAILED DESCRIPTION OF AN EXEMPLARY EMBODIMENT

Figure 1:
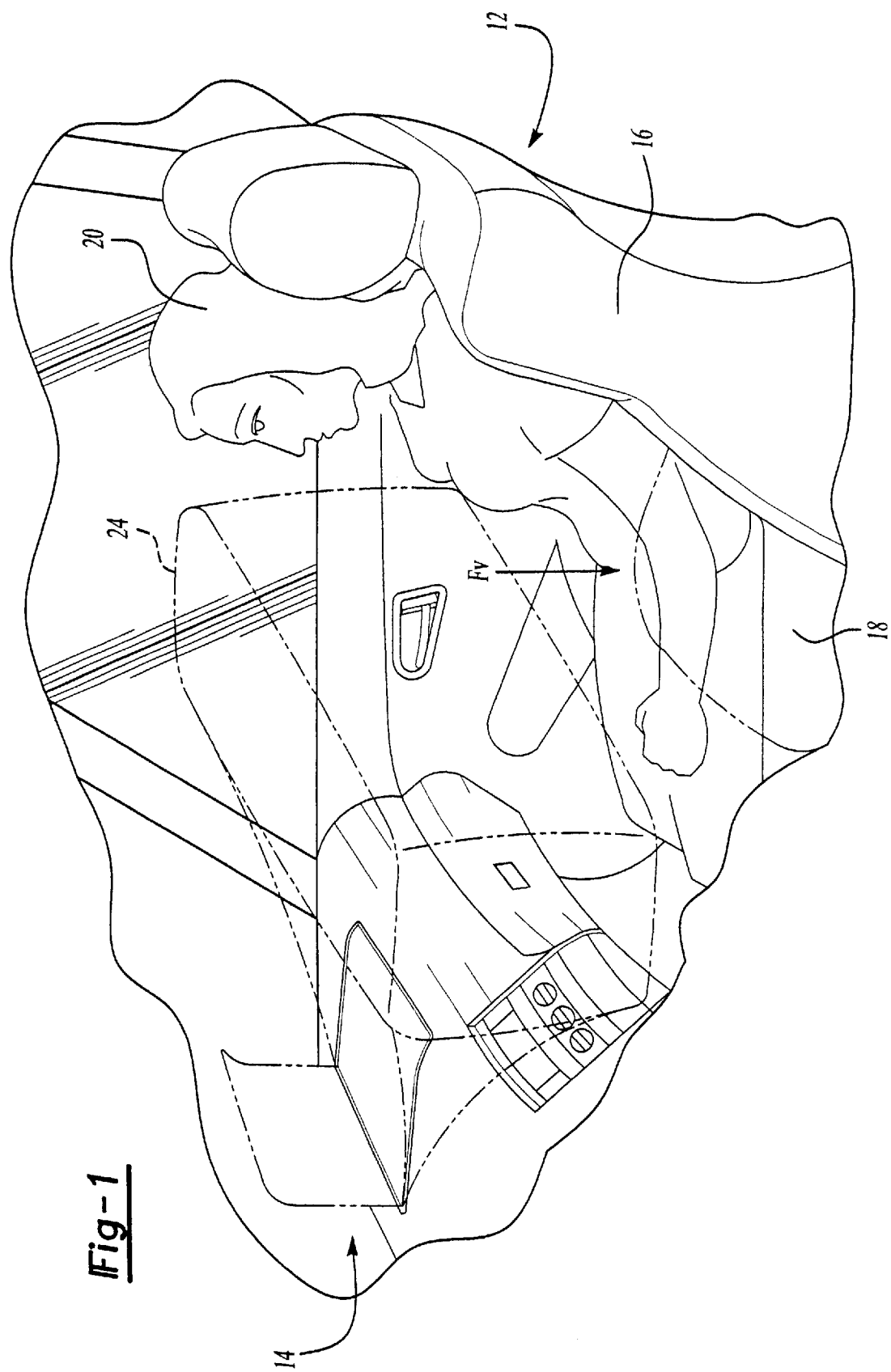
FIG. 1 is an environmental view of a seat occupant seated in a vehicle having in airbag system.

A vehicle includes a vehicle seat assembly, shown generally at 12 in FIG. 1, and an airbag system 14. The seat assembly 12 can be either a driver or passenger seat and includes a seat back 16 and a seat bottom 18. When a vehicle occupant 20 is seated on the seat 12 a vertical force Fv is exerted against the seat bottom 18. The vertical force Fv represents the weight of the seat occupant 20.

The airbag system 14 deploys an airbag 24 under certain collision conditions. The deployment force for the airbag 24, shown in dashed lines in FIG. 1, varies according to the weight of the occupant 20. The vehicle includes a unique system for measuring the weight of the seat occupant 20. This unique system is integrated into a seat frame or track member, generally indicated at 26 in FIG. 2.

The seat 12 is preferably mounted to a vehicle structure 30 on an inboard track assembly 26a and an outboard track assembly 26b that is spaced apart from the inboard track assembly 26a by a predetermined distance. Both the inboard 26a and outboard 26b track assemblies include first 28 and second 32 track members. The first track member 28 is typically mounted to a seat riser 34 or directly to the vehicle structure 30, such as a floor. The second track member 32 is mounted for sliding movement relative to the first track member 28 so that seat 12 position can be adjusted forwardly and rearwardly within the vehicle to a desired position.

A plurality of sensor assemblies 36 are mounted between the first track members 28 of the inboard 26a and outboard 26b track assemblies and the riser 34. In the preferred embodiment, four (4) sensor assemblies 36 are used with a first sensor assembly 36a positioned near the front of the inboard track assembly 26a, a second sensor assembly 36b positioned near the rear of the inboard track assembly 26a, a third sensor assembly 36c positioned near the front of the outboard track assembly 26b, and a fourth sensor assembly 36d positioned near the rear of the outboard track assembly 26b.

Preferably, each sensor assembly 36a, 36b, 36c, and 36d has a first end 40 mounted to the first track member 28 with at least one fastener 42 and a second end 44 mounted to the riser 34 with at least one fastener 42, as shown in FIG. 3. It should be understood that any type of fastener can be used and that other joining methods known in the art can also be used to mount the sensors 36. A central bendable portion 46 extends between the first 40 and second 44 ends of the sensor assembly 36. As the vertical force Fv of the seat occupant 20 is exerted on the seat bottom 18, the central bendable portion 46 of each sensor assembly 36a, 36b, 36c, 36d deflects or bends into an S-shaped configuration putting one portion of the sensor 36 in compression and another portion in tension.

In the embodiment of FIGS. 3 and 4, the first 40 and second 44 ends are raised above/below the central bendable portion 46 to form steps 38 on each side of the central bendable portion 46. The height of the steps 38 can be varied. This configuration forms gaps between the sensor 36 and the track member 28 and between the sensor 36 and the riser 34 to facilitate bending.

A strain gage 50 is mounted to each of the sensors 36a, 36b, 36c, 36d to measure the amount of bending in the central portion 46. The sensors 36 have a top surface 52 facing the seat bottom 18 and a bottom surface 54 facing the riser 34. Preferably, a combination of four (4) strain gages, forming a full bridge, are mounted on one of the top 52 or bottom 54 surfaces to measure the bending. The four strain gages are thus combined to serve as a Wheatstone Bridge for measuring deflection. The operation of a Wheatstone Bridge is well known in the art.

As shown in FIG. 4, the stain gage 50 is mounted on the top surface 52 of the sensor 36. A first aperture 56 is formed at the first end 40 of the sensor 36 and a second aperture 58 is formed at the second end 44 of the sensor 36 for receiving the fasteners 42. The strain gage 50 is positioned between the apertures 56, 58 on the top surface 52. In order to achieve more accurate readings, full-bridge strain gage 50 should have all strain gage components mounted on only one surface of the sensor 36. In other words, if the strain gage 50 is mounted on the top surface 52 then no strain gage components should be mounted on the bottom surface 54 or if the gage 50 is mounted on the bottom surface 54 then no strain gage components should be mounted on the top surface 52.

Figure 5:
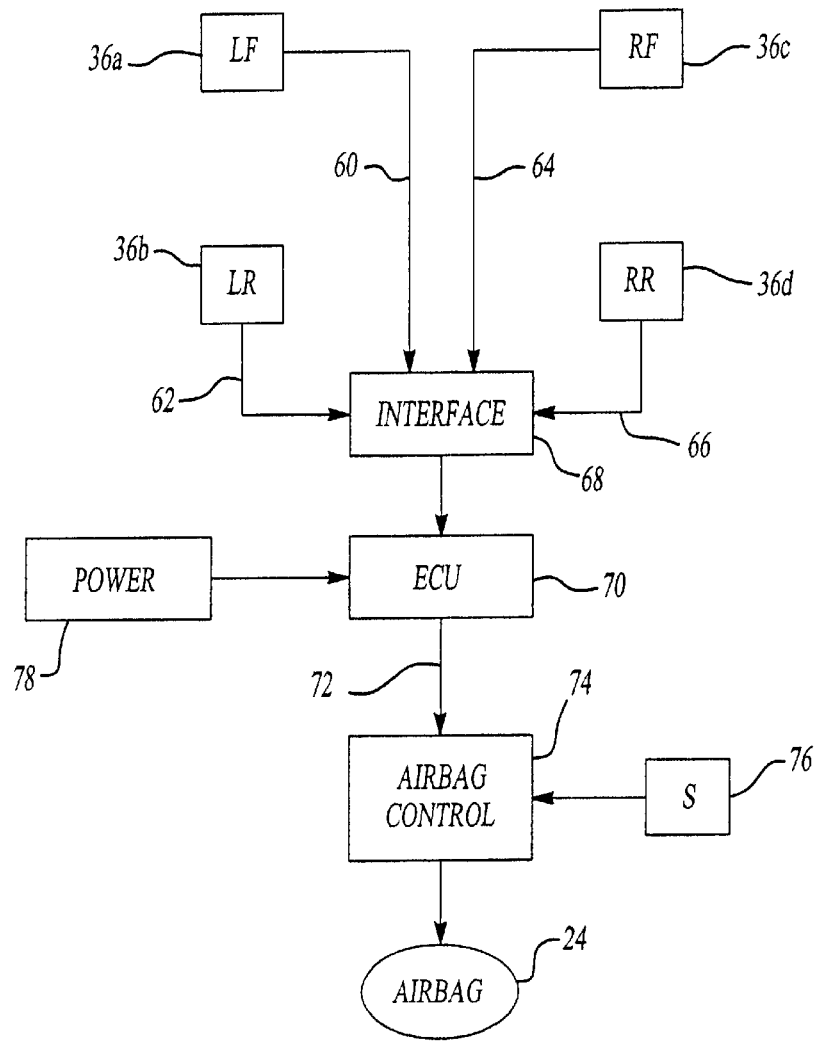
FIG. 5 is a schematic diagram of the control system incorporating the subject weight measurement system.

The sensors 36a, 36b, 36c, 36d each generate a signal representative of the occupant weight that causes bending at the respective location of the sensors 36a, 36b, 36c, 36d, see FIG. 5. Thus, the first sensor 36a generates a first signal 60, the second sensor 36b generates a second signal 62, the third sensor 36c generates a third signal 64, and the fourth sensor 36d generates a fourth signal 66. The signals 60, 62, 64, 66 are transmitted to a common interface unit 68 and are then fed into a central processor unit or electronic control unit (ECU) 70 as is known in the art. The ECU 70 combines the signals 60, 62, 64, 66 to determine the weight of the occupant 20. The ECU 70 then sends a control signal 72 to a system controller 74. Preferably, the system controller 74 is an airbag control module that is in communication with the ECU 70 such that the deployment force of the airbag 24 is controlled based on seat occupant weight. The system controller 70 could also be used to control the force of seat belt pretensioners based on occupant weight. A vehicle crash sensor 76 also supplies information to the airbag control module 74 that is used in preparation for the control instructions for the airbag 24. The system utilizes a power supply 78 as is known in the art.

Figures 6A, 6B:
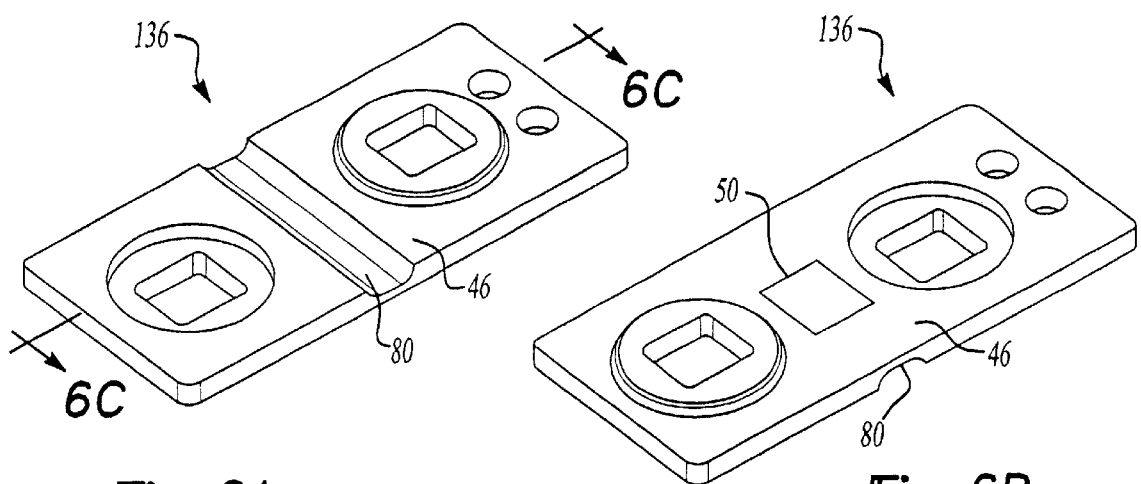
FIG. 6A is a top perspective view of a preferred embodiment of a sensor assembly.
FIG. 6B is a bottom perspective view of the sensor assembly of FIG. 6A.
Figure 6C:
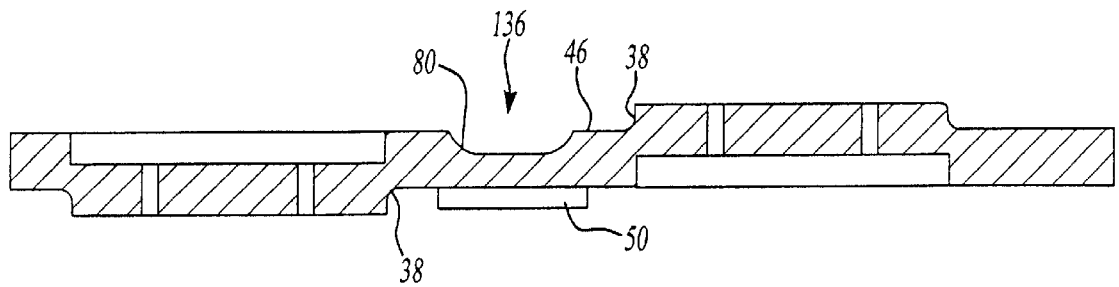
FIG. 6C is a cross-section view of the sensor assembly taken along 6C—6C of FIG. 6A.

A preferred embodiment of a weight sensor 136 is shown in FIGS. 6A–6C. In this preferred embodiment each of the sensor assemblies 136a, 136b, 136c, 136d includes at least one groove 80 formed in one of the top 52 or bottom 54 surfaces of the sensor 36. The groove 80 extends at least partially along the width of the sensor assembly 36 to localize strain in the central bendable portion 46. The full bridge strain gage 50 is placed the opposing surface, facing an opposite direction from the groove 80, see FIG. 6B. In this embodiment, the groove 80 extends across the entire with of the sensor 36.

Figure 7:
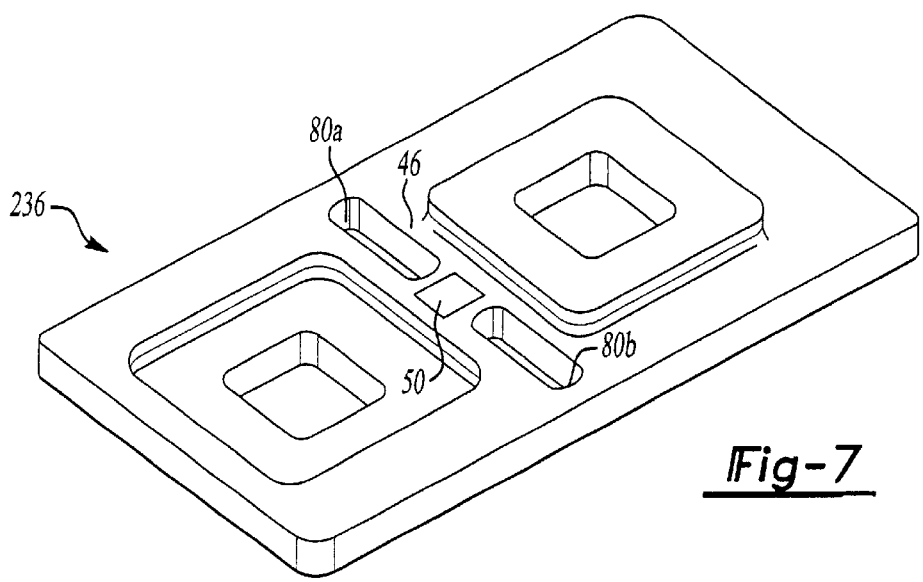
FIG. 7 is an alternate embodiment of a weight sensor.

In an alternate embodiment of a weight sensor 236, shown in FIG. 7, a pair of grooves 80a, 80b are formed in one of the top 52 or bottom 54 surfaces to localize strain in the central bendable portion 46. The grooves 80a, 80b are spaced apart from one another and only extend partially across the width of the sensor 36. In this embodiment, the strain gage 50 is mounted between the grooves 80a, 80b.

Figure 8:
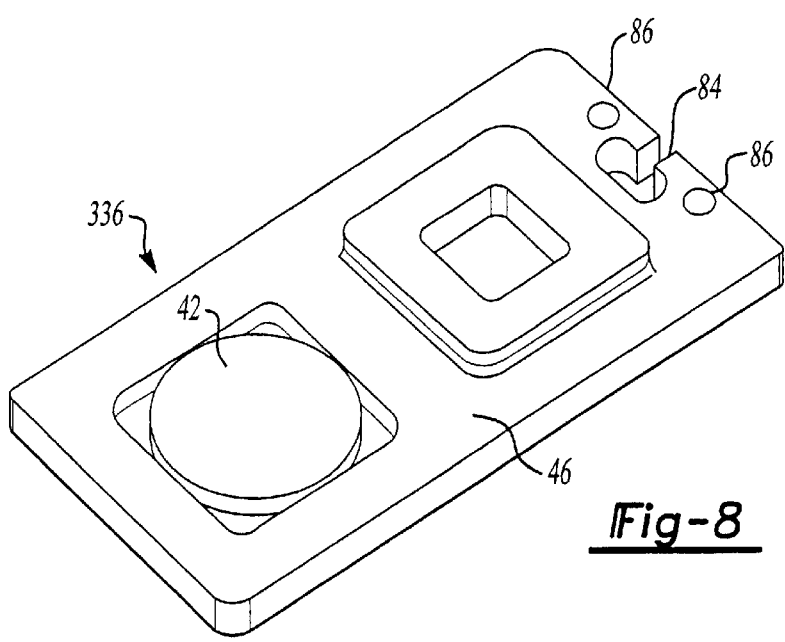
FIG. 8 is an alternate embodiment of a weight sensor.

In another alternate embodiment of a weight sensor 336, shown in FIG. 8, the sensor assembly 36 has a generally flat central bendable portion 46. A notch 84 is formed at one end that separates a pair of holes 86 that are used to connect the sensor 36 to the interface 68.

The subject invention offers a simplified system for measuring the weight of a seat occupant 20. It is preferable to integrate the sensors 36 between the track 28 and the riser 34 because they are common components for most vehicle seats 12. The subject weight measurement system is easily incorporated into any type of seat configuration. The measured weight is independent of seat position and is accurately provided in various occupant positions on the seat 12.

By measuring the deflection in all four (4) locations in the inboard 26a and outboard 26b track assemblies, it is possible to calculate the occupant weight, which is proportional to the sum of the output of all of the sensors 36a, 36b, 36c, 36d. The electronics for signal conditioning and the interface 68 can be housed within the track assemblies 26a, 26b as is well known in the art.

Although a preferred embodiment of this invention has been disclosed, it should be understood that a worker of ordinary skill in the art would recognize many modifications come within the scope of this invention. For that reason, the following claims should be studied to determine the true scope and content of this invention.

I claim:

1. A system for measuring a weight on a vehicle seat comprising:

a seat having a seat bottom;

a seat element for mounting said seat to a vehicle structure;

a seat support member for supporting said seat bottom relative to said seat element;

a sensor assembly mounted between said seat element and said seat support member and having a bendable central body portion for supporting at least one strain gage for measuring strain resulting from a weight force applied to said seat bottom, said bendable central body portion having a partially removed section to concentrate strain in said bendable central body portion wherein said partially removed section comprises a pair of co-linear slots extending through said central body portion and spaced apart from each other across the width of said central body portion by a mount surface.

2. A system according to claim 1 wherein said strain gage is mounted on said mount surface between said slots.

3. A system according to claim 2 wherein said sensor assembly includes a first end for attachment to said seat element and a second end for attachment to said seat support member, said bendable central body portion extending between said first and second ends, and wherein said slots are formed within said central body portion approximately at an equal distance from said first and second ends.

4. A weight sensor assembly for measuring a weight on a vehicle seat comprising:

a first end rigidly mounted to an upper seat structure;

a second end rigidly mounted to a lower seat structure;

a deflectable central body portion extending between said first and second ends and having an upper surface and a lower surface, said central body portion including a partially removed section for concentrating strain at said central body portion resulting from a weight applied to said upper seat structure wherein said partially removed section comprises a pair of co-linear slots extending through said central body portion and spaced apart from each other across the width of said central body portion by a mount surface; and a strain gage assembly mounted on said central body portion for measuring the strain at said central body portion.

5. An assembly according to claim 4 wherein said strain gage assembly is mounted on said mount surface between said slots.

6. An assembly according to claim 5 wherein said strain gage assembly and said slots are both located at the middle of said central body portion, approximately equal distances from said first and second ends.

7. A System for measuring a weight on a vehicle seat comprising:

a seat assembly having a seat bottom;

a seat element for mounting said seat assembly to a vehicle structure;

a seat support member for supporting said seat bottom relative to said seat element;

a plurality of weight sensor assemblies each including a first end rigidly mounted to said scat support member, a second end rigidly mounted to said seat element, a deflectable central body portion extending between said first and second ends and having an upper surface and a lower surface, said central body portion including a partially removed section for concentrating strain at said central body portion resulting from a weight applied to said scat support member wherein said partially removed section comprises a pair of co-linear slots extending through said central body portion and spaced apart from each other across the width of said central body portion, and a strain gage assembly mounted on said central body portion between said slots for measuring the strain at said central body portion wherein each of said weight sensor assemblies generates a weight signal in response to measuring deflection of said central body portion;

a processing unit for receiving said weight signals to quantify the weight applied to said seat assembly; and at least one safety device control module in communication with said processing unit wherein deployment of at least one safety device is controlled by said safety device control module based on the weight applied to said seat assembly.

8. A system according to claim 7 wherein said slots and said strain gage assembly are both located at the middle of said central body portion, approximately equal distances from said first and second ends.

* * * * *